W. M. LUTHER.
FRUIT SLICING AND SPREADING MACHINE.
APPLICATION FILED MAR. 17, 1915.
1,269,291.
Patented June 11, 1918.
2 SHEETS—SHEET 1.
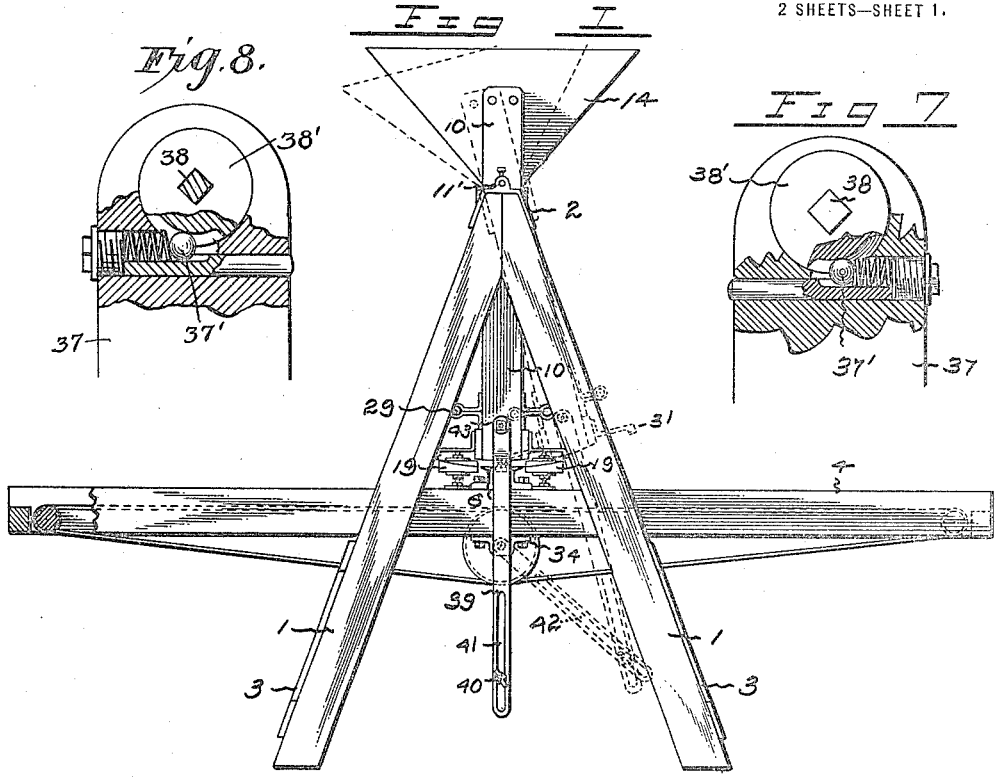
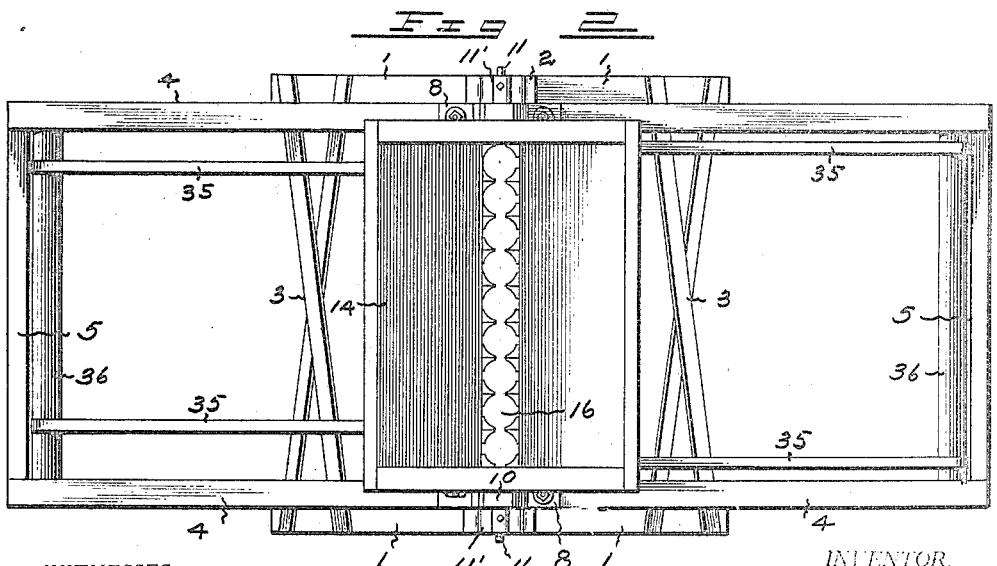
WITNESSES:
INVENTOR.
William M. Luther
BY
ATTORNEY W. M. LUTHER.
FRUIT SLICING AND SPREADING MACHINE.
APPLICATION FILED MAR. 17, 1915.
1,269,291.
Patented June 11, 1918.
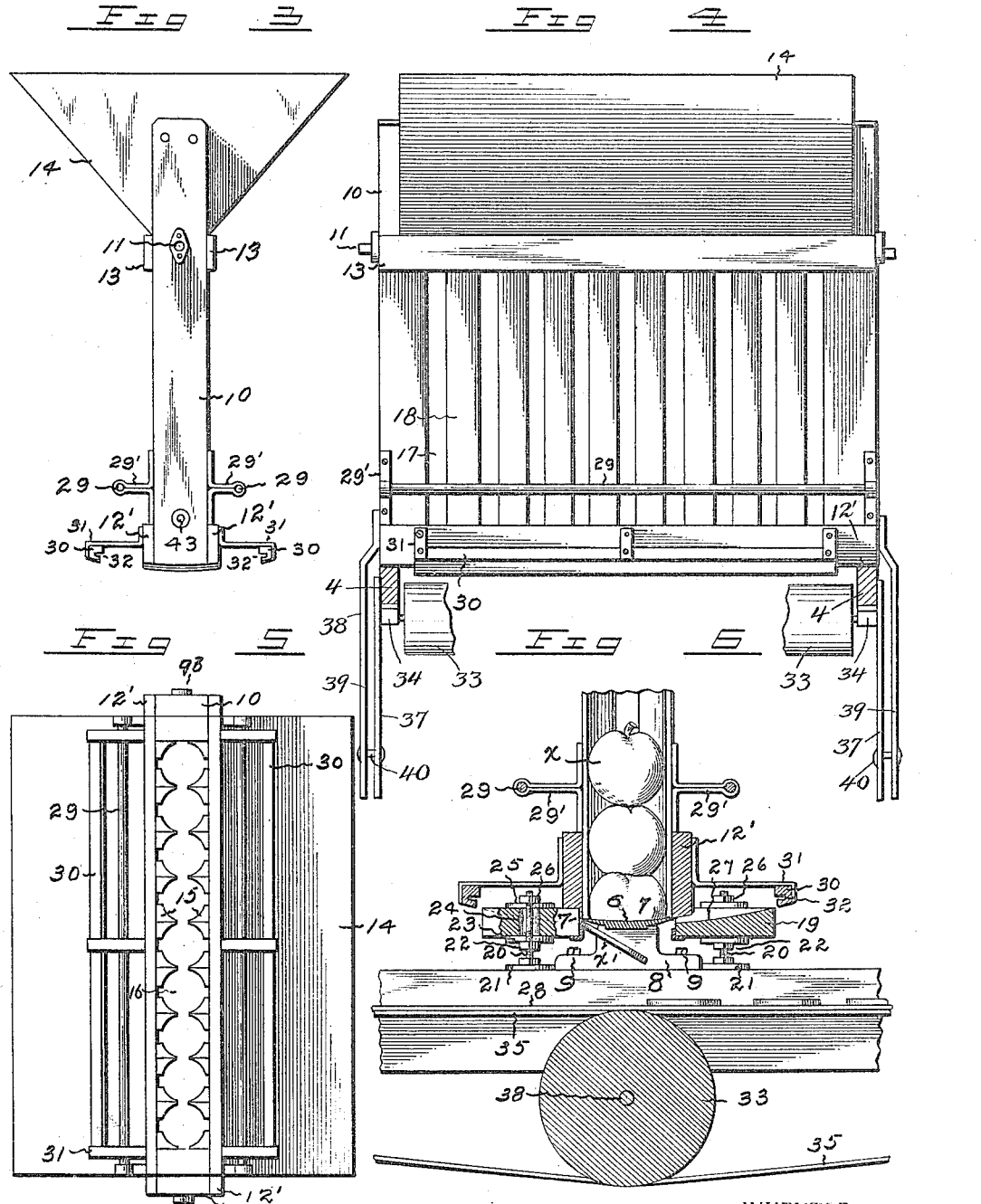
WITNESSES:
R. Rucker
Roy L Bailey
INVENTOR.
William M. Luther
BY Baldwin Vale
ATTORNEY.

UNITED STATES PATENT OFFICE.

WILLIAM M. LUTHER, OF SAN FRANCISCO, CALIFORNIA.

FRUIT SLICING AND SPREADING MACHINE.

1,269,291.

Specification of Letters Patent.

Patented June 11, 1918.

Application filed March 17, 1915. Serial No. 15,096.

*To all whom it may concern:*

Be it known that I, WILLIAM M. LUTHER, a citizen of the United States, residing in the city and county of San Francisco, State of California, whose post-office address is 1242 Taylor street, have invented new and useful Improvements in Fruit Slicing and Spreading Machines, of which the following is a specification.

This invention relates more particularly to machines for uniformly slicing and spreading apples, fruit or vegetable of like nature; and uniformly spreading said slices upon drying or dehydrating trays.

Among the objects of this invention are to produce a slicing and spreading machine;

That is simple and effective in operation;

That may be cheaply produced and maintained;

That will automatically line up the fruit in vertical columns ready for the slicing operation;

That will slice the fruit with the minimum waste, in slices of uniform thickness;

That will uniformly place the slices on the trays in synchronism with the slicing operation.

Other objects and advantages will appear as the description progresses. In the drawing accompanying and forming part of the present specification, to which like reference characters have been applied, a simple form of putting this invention into practice is shown. I do not wish to be understood as confining this invention to the disclosures made in said drawing and description, as many variations may be introduced, within the spirit of this invention, as defined in the claims succeeding the said description.

In preparing fruit such as apples and the like for drying or dehydration by the natural or artificial processes in practice, it is important to slice the apples into slices of uniform thickness, so that the process of dehydrating may be uniform with respect to each slice. It is important that all of the moisture be removed from each slice, which process could not be uniform if the slices varied in thickness. It is also important that the slices be uniformly placed on the trays to permit the free circulation of air thereabout during the dehydration process.

In the two sheets of drawings—

Figure 1 is a side elevation of a slicing and spreading machine constructed in accordance with this invention.

Fig. 2 is a plan view from above of the same.

Fig. 3 is an enlarged detail of the receiving and feeding mechanism.

Fig. 4 is a front elevation of the same.

Fig. 5 is a plan view from below looking upward, of the same.

Fig. 6 is an enlarged fragmentary detail of the feeding mechanism, in operative relation with the slicing and spreading mechanism, showing the inter-relation and adjustability of these various mechanisms.

Fig. 7 is an enlarged detail in front elevation partially in cross section of the preferred form of clutch.

Fig. 8 is an enlarged detail partially in cross section showing the reverse clutch on the opposite side of the machine.

In detail the construction illustrated in the drawings includes the inclined supporting legs 1—1 secured together at the point of conjunction by the overhanging brackets 2, and laterally braced by the transverse braces 3—3 having their opposite ends secured to their respective supporting legs 1; all combining to form a rigid supporting structure, giving the maximum strength with the minimum amount of material.

The feed table includes the side bars 4—4 joined at the ends by the cross bars 5—5 forming a rigid rectangular open frame. The side bars 4 are rigidly fixed to the legs 1—1 between the opposite sides, from which they extend horizontally in front and behind the supporting structure, to which they contribute a bracing strength.

The slicing mechanism consists of the blade 6, the median line of which is located on the transverse center of the tray feed table, and in line with the vertical center of the fruit feeding mechanism hereinafter described. The knife has the two sharp edges 7—7, and is supported on the brackets 8—8 fixed to the opposite ends thereof and secured to the tops of the side bars 4 by the bolts 9.

The fruit feeding mechanism includes the side bars 10—10 provided with the trunnions 11—11 engaging the bearings 11' formed in the brackets 2; the lower ends of the side bars 10 are joined by the cross bars 12' secured to the opposite sides thereof. These side bars are joined approximately in line with the trunnions by the crossbars 13—13, above which the flaring hopper 14 is secured between the upper ends of the cross bars 10. This hopper is preferably in the shape of an inverted triangle, open at the top and terminating in a narrow opening at the bottom or apex of the triangle. The opening in the bottom is proportioned to the size of the fruit to be handled. In describing the present embodiment of this invention the description will be confined to its use in slicing apples, although it is obvious that it has many more uses than those herein particularized. The lower opening in the hopper is divided into nine approximately circular divisions; divided by the quarter round strips 15 attached to the upper and lower cross bars 12' and 13, to form vertical chutes leading from the bottom of the hopper downward to a level with the cutting edges of the slicing blades 6.

The machine operates substantially as follows:—

The apples X are dumped into the hopper 14 from which they roll downward into the chutes 16, stacking themselves into vertical columns visible through the spaces 17 between the slats 18 concealing the moldings 15. In descending into the chutes 16 the apples naturally dispose themselves in single super-imposed arrangement visible through the openings 17, through which they can be easily manipulated by the fingers of the operator and arranged with their cores vertically. This arrangement of the fruit is not essential to the operation of this machine, but it is desirable for the appearance and quality of the product, that the slices be across the core.

The slice gages consist of the cross blocks 19, extending across the tray frame and having their opposite ends supported on the studs 20—20, respectively secured in the plates 21 secured to the side bars 4. These studs 20 are provided with the running nuts 22 threaded thereon and engaging the underside of the plates 23 upon which the blocks 19 rest. The studs 20 extend through the slots 24 in the opposite ends of the blocks 19 and through the top plates 25. The blocks 19 are clamped between the plates 23 and 25 by the nuts 26 screwed on the upper end of the studs 20. The slots 24 permit lateral adjustment of the blocks with respect to the parallel edges 7 of the cutting blade 6. The nuts 22 and 26 threaded on the studs 20 permit a vertical adjustment of the blocks 19, to vary the thickness of the slices removed at each stroke of the machine. The blocks 19 are provided with gage surfaces 27 planed out of the top of the blocks 19 and forming the segment of a circle struck from the axis of the trunnions 11; the surface 27 being parallel with the stroke of the stacking and feeding mechanism. The upper surface of the knife 6 may also be curved on a radius struck from the trunnions 11.

Referring to the drawing Fig. 6, the slicing mechanism is shown in mid-stroke with the nethermost apple resting upon the top of the blade 6 and the slice X' severed therefrom in the act of falling away from the underside of the blade 6, and descending toward the floor of the tray 28, traveling beneath.

Slicing is accomplished by grasping either of the cross-handles 29 on opposite sides of the machine and swinging the stacking and feeding mechanism back and forth on the trunnions 11. Fig. 6 shows the mechanism in mid-stroke toward the righthand side, the completion of this stroke will carry the lower apples beyond the lateral edge 7 of the blade off of which they will drop by gravity onto the surface 27, that is adjusted as described below the plane of the cutting edge the proper distance to give the desired thickness of slice. Upon the return stroke to the left, the lower apples are forced against the cutting edge 7 that removes a slice therefrom that drops onto the tray disposed beneath the cutting blade as described. Each lateral stroke of the fruit feeding mechanism results in one slice removed from the lower apples disposed in vertical columns in the chutes 16. The columns of apples dropping one slice lower with each stroke as described.

In cutting very thin slices it occasionally happens that a slice will adhere to the lower side of the cutting blade. Such a suspended slice is removed by the stripper 30, fixed on the bracket 31 extending outward from the cross bars 12, the slot 32 passing over the edge 7 of the blade at each complete stroke of the fruit feeding mechanism, stripping off the slices that may adhere to the underside of the blade, causing them to drop into the trays as described. The lower edge of the stripper 30 scrapes the juice from the gage surface 27 preventing accumulation thereon.

The tray feeding mechanism consists of the traction roller 33, fixed on a central shaft journaled in the bearings 34 fixed to the underside of the side beams 4 on opposite sides of the machine. This roller is grooved to receive the endless belts 35—35 extending outward therefrom encircling the lateral rollers 36—36 journaled in opposite ends of the feeding table, between the side beams 4—4. The opposite ends of the shaft 38 fixed in the roller 33 are squared to engage the ratchets 38' that are frictionally engaged by the balls 37' confined in the arms 37 and jammed against the ratchets by the swing of the arms. The balls 37' are placed on opposite sides of the center in the ratchets on the opposite sides of the machine, to cause the ratchets to engage alternately with the forward and backward swing of the arms 37 respectively. The arms 37 are swung back and forth on opposite sides of the center 38 by the slotted arms 39, extending downward from the side bars 10, to which they are rigidly fixed. The adjustable pivots 40 engage the slot 41, and are slidable in the slots 42 in the arms 37. The pivots 40 may be adjusted to increase or decrease the length of the stroke of the arms 37, to feed the trays forward the proper distance with respect to the diameter of the fruit being sliced. The ratchet engagement of the arms 37 engaging alternately with the forward and back strokes of the arms 39, obviously will move the roller 33 in one direction only. The fruit trays may be any of the well known forms, consisting of rectangular frames with a shook or wire netting bottoms. These trays are laid on the belts 35 and are carried forward under the slicing mechanism. The intermittent strokes of the slicing mechanism synchronize the forward movement of the trays so that the slice X' will be laid in uniform lines across the trays in their movement through the machine. The handles 29 secured to the side bars 10 by the bracket 29' are provided for operating the machine by hand. It is obvious however, that the machine may be power driven by coupling it to a prime mover by any of the simple means that will suggest themselves to anyone with ordinary mechanical skill, without departing from the spirit of this invention.

The bumpers 43 fixed to and projecting from the side bars 10 abut the inner edges of the supporting legs 1—1, or suitable projection thereon, to limit the stroke of the feeding mechanism when operated by hand. These bumpers are very cheaply formed of a length of heavy rubber tubing surrounding a stud projecting from the side of the bars 10. In the power driven machine the bumpers are unnecessary, as the length of the stroke will be determined by the driving mechanism.

Having thus described this invention what I claim and desire to secure by Letters Patent is:—

1. A slicing machine including a supporting frame, a feeder pivoted on said frame; a slicing blade beneath said feeder; conveying mechanism beneath said blade; frictional means attached to said conveying mechanism and connected to said feeder whereby movement of the pivoted feeder is synchronized with the operation of the conveying mechanism, for carrying away the cut slices.

2. A slicing machine including a supporting frame, a feeder pivoted on said frame, a slicing blade beneath said feeder, a stripper spaced outward from said feeder and having a slot adapted to engage said slicing blade; and a traction roller journaled in said frame beneath said blade and working synchronously with the said feeder.

3. A slicing machine including a supporting frame, a feeder pivoted in said frame; a gage adjacent to and below the level of said cutting blade; a stripper placed outward from said feeder having a slot adapted to engage said slicing blade and wipe across said blade; a traction roller journaled in said frame beneath said blade; ratchet clutches engaging the journals of said roller; and operating means on said feeder connected with said clutches.

4. A slicing machine including a supporting frame; a feeder pivoted on said frame and divided into vertical chutes open at the bottom; a slicing blade sharpened on both lateral edges fixed beneath said feeder; gages adjacent to and below the level of the cutting edges of said blade; a traction roller journaled in said frame beneath said blade; ratchet clutches engaging the journals of said roller; operating means on said feeder connected with said clutches.

5. A slicing machine including a supporting frame; a feeder pivoted on said frame and divided into vertical chutes open at the bottom; a slicing blade sharpened on both lateral edges fixed beneath said feeder; gages adjacent to and below the level of the cutting edges of said blade; a traction roller journaled in said frame beneath said blade; ratchets fixed on the opposite ends of the journal of said roller; arms pivoted on said journals having oppositely disposed pawls engaging said ratchets; and arms fixed on said feeder pivotally engaging said pivoted arms.

6. A slicing machine including a supporting frame; a feeder pivoted on said frame and divided into vertical chutes open at the bottom, a slicing blade sharpened on both lateral edges fixed beneath said feeder; gages adjacent to and below the level of the cutting edges of said blade; a traction roller journaled in said frame beneath said blade; ratchets fixed on the opposite ends of the roller journals; arms pivoted on said journals having oppositely disposed pawls engaging said ratchets; arms fixed on said feeder pivotally engaging said pivoted arms; roller journaled in said frame on opposite sides of said traction roller and endless belts encircling said rollers and the traction roller.

7. A slicing machine including a supporting frame a feeder pivoted on said frame; a slicing blade beneath said feeder; a stripper spaced outward from said feeder and having a slot adapted to engage said slicing blade.

8. A slicing machine including a supporting frame, a feeder pivoted in said frame; a gage adjacent to and below the level of said cutting blades; a stripper spaced outward from said feeder having a slot adapted to engage said slicing blade and wipe across said gage.

9. A slicing machine including A shaped side supports, and a rectangular horizontal frame fixed between said side supports and extending laterally therefrom, a feeder divided into vertical chutes open at the bottom; trunnions on said feeder mounted in bearings fixed to said side frame; a hopper fixed to said feeder above said chutes; a slicing blade sharpened on both lateral edges and fixed beneath said feeder; gages adjacent to and below the level of the cutting edges of said blade; a traction roller journaled in said horizontal frame beneath said blade; ratchets fixed on the opposite ends of the roller journals; arms pivoted on said journals having oppositely disposed pawls engaging said ratchets; arms fixed on said feeder pivotally engaging said pivoted arms; roller journaled in the opposite ends of said frame; and endless belts encircling said rollers and said traction roller.

10. A slicing machine including a supporting frame, a feeder pivoted on said frame; arms extending from said feeder; a slicing blade beneath said feeder; conveying mechanism beneath said blade; frictional means attached to said conveying mechanism and connected to said feeder arms whereby movement of the pivoted feeder is synchronized with the operation of the conveying mechanism for carrying away the cut slices.

In testimony whereof, I have hereunto set my hand this 15th day of February, 1915.

WILLIAM M. LUTHER.

Witnesses:
BALDWIN VALE,
A. J. HENRY.

Copies of this patent may be obtained for five cents each, by addressing the "Commissioner of Patents, Washington, D. C."